United States Patent [19]
Leiber et al.

[11] Patent Number: 5,491,383
[45] Date of Patent: Feb. 13, 1996

[54] MOTOR VEHICLE LIGHT CONTROLLING DEVICE

[75] Inventors: Heinz Leiber, Oberriexingen; Heinz-Georg Burghoff, Reichenbach; Horst Brinkmeyer, Waiblingen, all of Germany

[73] Assignee: Mercedes-Benz AG, Germany

[21] Appl. No.: 352,210

[22] Filed: Dec. 2, 1994

[30] Foreign Application Priority Data

Dec. 2, 1993 [DE] Germany ............ 43 41 058.8

[51] Int. Cl.⁶ .................................................. B60Q 1/26
[52] U.S. Cl. .............................. 315/77; 315/79; 315/80; 315/83; 340/641
[58] Field of Search ............................... 315/77, 78, 79, 315/80, 82, 83; 307/10.8; 340/641, 648, 428

[56] References Cited

U.S. PATENT DOCUMENTS

| | | | |
|---|---|---|---|
| 3,778,676 | 12/1973 | Keller | 315/217 |
| 4,136,333 | 1/1979 | Sumida et al. | 340/147 C |
| 4,156,151 | 5/1979 | Borroni | 307/10 R |
| 4,227,181 | 10/1980 | Brittain | 340/167 R |
| 4,594,571 | 6/1986 | Neuhaus et al. | 340/52 F |
| 4,665,321 | 5/1987 | Chang et al. | 315/82 X |
| 4,667,129 | 5/1987 | Papillon | 315/82 |
| 4,667,187 | 5/1987 | Volk et al. | 315/82 X |
| 4,678,925 | 7/1987 | Grocke | 315/82 X |
| 4,683,403 | 7/1987 | Iwamoto et al. | 315/83 |
| 4,723,095 | 2/1988 | Svazas et al. | 315/82 |

FOREIGN PATENT DOCUMENTS

| | | |
|---|---|---|
| 0033664A1 | 8/1981 | European Pat. Off. . |
| 0082300A2 | 6/1983 | European Pat. Off. . |
| 0279168A2 | 8/1988 | European Pat. Off. . |
| 0430792A1 | 6/1991 | European Pat. Off. . |
| 4136427A1 | 5/1993 | Germany . |
| 4308514A1 | 9/1993 | Germany . |

*Primary Examiner*—Robert J. Pascal
*Assistant Examiner*—Haissa Philogene
*Attorney, Agent, or Firm*—Evenson, McKeown, Edwards & Lenahan

[57] ABSTRACT

A motor vehicle light controlling device includes an operating switch and electronics assigned to the operating switch for supplying current to a multiplicity of lamps of the operating light system. At least one controlled switching component provides a clock-controlled supply of current to the assigned lamp circuit. The device is divided into a light switch module and a rear lamp module. A clock control provided, distributed over both modules, in order to influence the lamp currents of the vehicle operating lights. That is, in order to lower the luminosity of certain lights when required, and to be able to increase the on-board system voltage temporarily without the luminosity or lamp power changing as a result. The latter is of interest, for example, for the brief driving of electrical heating elements or servomotors to achieve an advantageously high utilization of conductor material. Lamps for driving light can be dimmed when the vehicles stationary to a luminosity corresponding to the customary parking light. Or, in the event of failure of a lamp or of a circuit for driving light, the corresponding headlamp can be supplied with current clock-controlled for lower light power for an emergency driving light function.

24 Claims, 1 Drawing Sheet

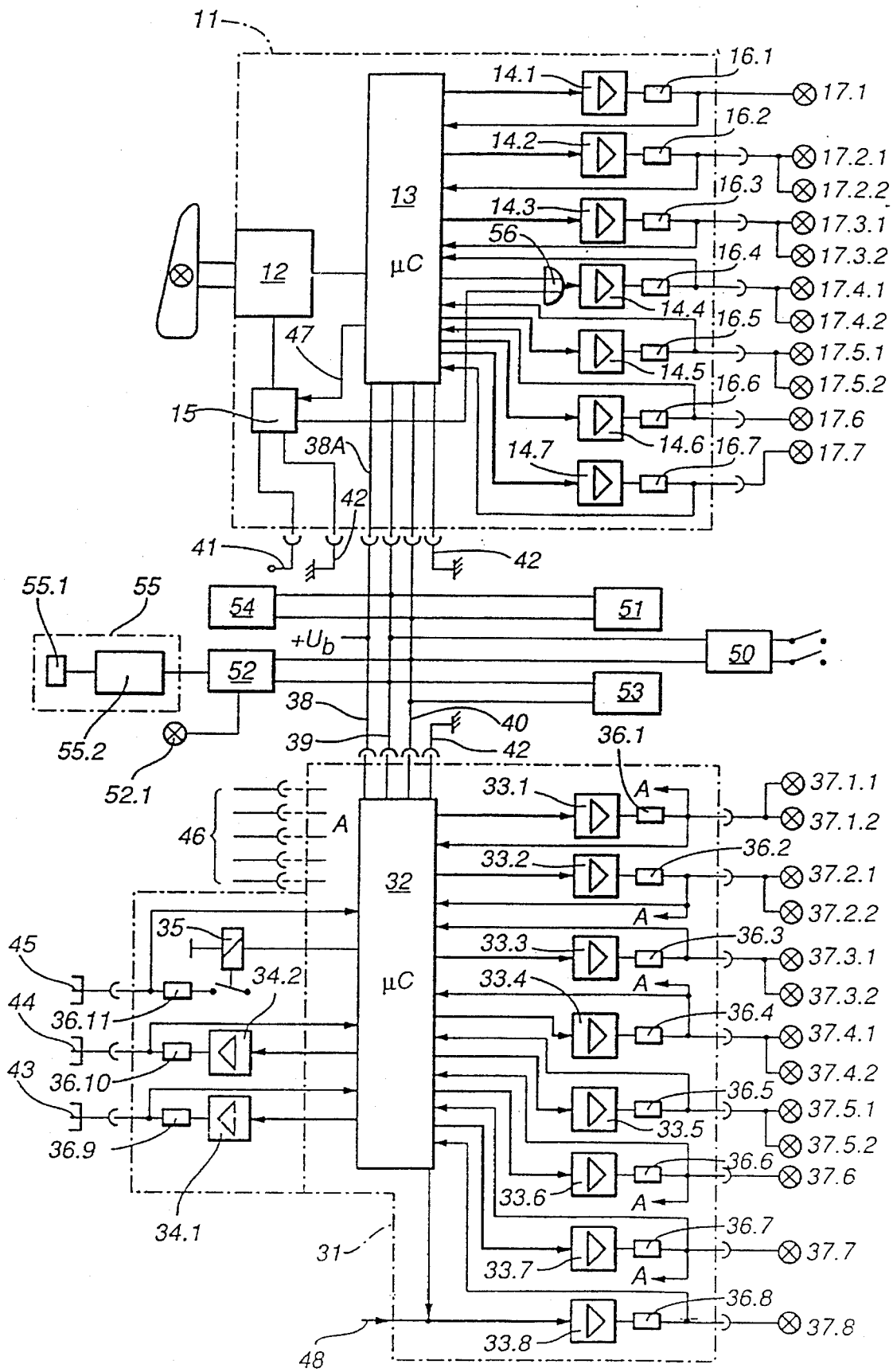

MOTOR VEHICLE LIGHT CONTROLLING DEVICE

BACKGROUND AND SUMMARY OF THE INVENTION

The present invention relates to a light controlling device for a motor vehicle, and more particularly, to a device comprising an operating switch and electronic apparatus assigned to the operating switch for supplying current to a multiplicity of lamps of an operating light system and having for each lamp function at least one controlled switching component for clock-controlled supplying of current to an assigned lamp.

It is known technology that the functioning of a light unit, such as for example the dipped headlight or rear brake light, is monitored, and a defect or a malfunction leads to an indication via, for example, a warning lamp.

DE 43 08 514 A1 discloses a vehicle headlamp control system which has a control circuit which controls the illumination intensity and the operation of the vehicle headlamps when starting the vehicle engine. The control circuit operates such that the switching transistors, via which the individual headlamps are connected to the on-board electrical system, are driven by switching pulses. The pulse duty factors of the respective driver pulse streams are set in the way required for desired illumination intensities of the headlamps.

EP 02 79 168 B1, which corresponds to DE 37 02 517 A1, further discloses a circuit arrangement suitable for supplying power to vehicle loads. The circuit comprises switchgear which is driven by a central unit via a ring-bus system and connects to the supply corresponding loads of a supply current conductor of the bus system. The load currents are monitored in order to detect any short-circuits.

DE 41 36 427 A1 discloses an electronically controlled motor vehicle lighting system in which the switching on and off of the vehicle lighting, and also the luminosity regulation of the headlamps, are controlled automatically according to the light, visibility and traffic conditions by electronics with associated photoelectronic components for light measurement.

It is an object of the present invention to provide a motor vehicle light controlling device which allows the energy balance of the on-board electrical system to be improved and better utilizes the conductor material used.

This object has been achieved in a motor vehicle light controlling device according to the present invention by dividing the device into a light switch module and a rear lamp module, with clock control distributed over both modules in order to influence the lamp currents of the operating lights of the vehicle. That is, to be precise, on the one hand, to lower the luminosity of certain lights when required and, on the other hand, to increase the on-board system voltage temporarily without the luminosity or lamp power changing as a result. The latter is of interest, for example, for the brief driving of electrical heating elements or servo-motors, in order to achieve an advantageously high utilization of conductor material used.

For instance, the lamps for driving light when stationary can be dimmed to a light power corresponding to the customary parking light. Or, in the event of failure of a lamp or of a circuit for driving light, the corresponding headlamp can be supplied with current clock-controlled for lower light power, so that an emergency driving light function can be realized. Furthermore, the clock output stages can be used at the same time to realize an electronic protection of the individual lamp circuits, so that it is possible to dispense with a considerable number of conventional, exchangeable fuse elements as well as the space required for installing them. Another feature within the scope of the present invention allows the automatic switching on of lights according to requirements by a light sensor signal of a light sensor, for example in the lower boundary surface of an outside rear-view mirror.

A major advantage of the device of the present invention is a reduction in the number of required lines or cable sets to be kept in stock and the improvement in the energy balance of the on-board system, by virtually eliminating the power loss which occurs at series resistors when the latter are used for dimming operating lights.

BRIEF DESCRIPTION OF THE SOLE FIGURE

These and other objects, features and advantages of the present invention will become more readily apparent from the following detailed description thereof when taken in conjunction with the accompanying sole figure which is a schematic circuit diagram of the light controlling device in accordance with the present invention.

DETAILED DESCRIPTION OF THE SOLE FIGURE

The device comprises a light switch module 11, which includes an operating switch 12 and a first microcomputer 13 and is arranged in the dashboard of the motor vehicle, and a rear lamp module 31, which is installed in the rear region of the vehicle and includes a second microcomputer 32. The microcomputers 13, 32 may expediently be special designs for operation on an only two-wired serial data line.

Apart from their respectively local frame terminal 42, the two modules 11, 31 are connected to each other via only three further line conductors 38, 39 and 40. The relatively thick line conductor 38 carries on-board system potential (so-called "terminal 30"); apart from supplying power to the parts contained in the modules 11, 31, the conductor 38 serves also to supply power to the individual lamps. The conductors 39, 40 form a two-wire bus line, for example conforming to the CAN standard.

Also connected to this two-wire bus line 39, 40 are the central control unit 50, the instrument cluster 51 in the dashboard, at least one door control unit 52 which also drives an exit light 52.1, an ABS control unit 53 and an air bag or passenger restraint system control unit 54. The operating power supply of the unit 54 has been omitted here for the sake of simplicity. The door control unit 52 may be connected to an outside mirror unit 55, which includes a light sensor 55.1 and an evaluation circuit 55.2 for the sensed luminosity. The light sensor may be arranged on or in the underside of an outside rear-view mirror.

The computer 13 in the light switch module 11 drives on the output side switching output stages 14.1 to 14.7, which respectively drive, via shunts 16.1 to 16.7, the lamp 17.1 of at least one interior light, the lamps 17.2.1 and 17.2.2 of the two front fog lights, the lamps 17.3.1 and 17.3.2 of the two front headlights, the lamps 17.4.1 and 17.4.2 of the two front driving lights, the lamps 17.5.1 and 17.5.2 of the two front parking lights, and at least one lamp 17.6 and 17.7 each of the right-hand and left-hand front direction indicating lights.

Without restricting the general applicability of the present invention, all the switching output stages 14.1 to 14.7 are supplied from the $+U_b$ rail or bus 38A in the light switching module. However, a showing of the corresponding connection has been omitted for the sake of overall clarity.

The voltage drops at the shunts 16.1 to 16.7 can be sensed and processed by corresponding return lines to the microcomputer 13. Furthermore, a circuit 15 driven in a redundant mode by the operating switch 12, is supplied from a likewise redundant operating line rail 41 or bus and a likewise redundant frame terminal 42, is connected to the microcomputer 13 via a path 47 and has an output side acting on an OR logic gate 56 which is connected by its other input into the driving path between a microcomputer 13 and a switching output stage 14.4 for the driving light. From the operating switch 12, the circuit 15 can be fed a signal specific for the driving light setting.

By making use of the shunts 16.1 to 16.7, a fully or partially electronic protection of the lamp circuits can be realized in the light switching module 11. Also, the circuits can also be protected in the conventional way by exchangeable fuses, in which case, the entire module can then be configured as disclosed, for example, in DE 43 24 690 C1.

The redundant power supply for the circuit 15 may be performed, for example, from a small additional secondary battery (not shown), which is isolated by a buffer diode (not shown) from the general on-board system and constantly recharged therefrom and, for example, also supplies the triggering energy for the air bag (not shown).

The computer 32 in the rear lamp module 31 also drives on the output side switching output stages 33.1 to 33.7, which for their part respectively drive via output-side shunts 36.1 to 36.7 the at least one lamp 37.1.1, 37.1.2 of the at least one fog tail light, the lamps 37.2.1 and 37.2.2 of the two tail lights, the lamps 37.3.1 and 37.3.2 of the two reversing lights, the lamps 37.4.1 and 37.4.2 of the two brake lights, the lamps 37.5.1 and 37.5.2 of the registration plate lighting, the lamp 37.6 or 37.7 of the corresponding rear direction indicating light and also the lamp 37.8 of the trunk lighting.

Again without restricting the general applicability of the present invention, all the switching output stages 33.1 to 33.7 are supplied from the +U$_b$ rail or bus 38A in the rear lamp module. Again, however, a showing of the corresponding connection has been omitted for the sake of overall clarity.

A fully or partially electronic protection of the lamp circuits supported by the shunts 36.1 to 36.8, can also be realized in the rear lamp module 31. Here too, the voltage drops at the shunts 36.1 to 36.8 can be sensed and processed by corresponding return lines to the microcomputer 32, so that an electronic monitoring for and protection against excess current/short-circuit or lamp defect is possible very simply by evaluation of the voltage dropping at the shunts. Also, the circuits can also be fully or partially protected in the conventional way by exchangeable fuses.

The outgoing supply leads to the rear tail lights, fog tail lights, reversing lights, brake lights, indicating lights and license plate lights are led as indicated by arrows in the sole figure, to a termination panel A to which can be connected, via a correspondingly multipole line 46, for example, the plug socket of a trailer coupling, from which the tail lighting of a trailer can be supplied.

The microcomputer 32 in the rear lamp module 31 can, in addition, also drive further switching output stages 34.1, 34.2 or else at least one electromechanical switching component 35, which accordingly supply the on-board voltage via shunts 36.9 to 36.11 to further circuits 43 to 45 in order to supply other loads besides.

In terms of operation of the device, the vehicle driver preselects the desired lighting situation by way of the operating switch 12. Optionally, this can also be set automatically, in dependence on the current operating state of the vehicle (e.g., at rest, when stationary, driving), by a system sensing the ambient brightness, for example by the light sensor 55.1 and the downstream evaluation circuit 55.2 in the outside mirror unit 55 via the BUS 39, 40.

On one hand, the computer 13 thus prepares from this sensed state driving signals for the output stages 14.1 to 14.7 and on the other hand, prepares a bus message to the computer 32 in the rear lamp module 31. The switching output stages 14.2 to 14.7 and 33.1 to 33.7 are driven according to these signals. In this case, the driving may be performed in steady-state or clocked mode.

The clock timing has the effect of influencing the lamp currents of the operating lights of the vehicle, in order to allow, on one hand, the luminosity of certain lights to be lowered when required (effective current reduction), and in order, on the other hand, to allow the on-board system voltage to be temporarily increased without thereby changing the luminosity or lamp performance (effective current maintenance).

The lamps 17.4.1 and 17.4.2 of the lights for driving light are dimmed when stationary to a light power of the lamps 17.5.1 and 17.5.2 for driving light corresponding to the customary parking light, or after the transition to the stationary state the power supply of the lamps 17.4.1 and 17.4.2 is automatically switched off and the power supply of the lamps 17.5.1 and 17.5.2 for the parking light is automatically switched on. In the event of failure of a lamp 17.4.1 or 17.4.2 or the circuit for driving light, the power of the corresponding headlight lamp 17.3.1 or 17.3.2 is timed with respect to its ON period such that the resulting effective operating current permits emergency driving lighting with to some extent little glare.

If the microcomputer 13 becomes defective and is no longer able to transfer an error-free signal via the line 47 to the circuit 15 supplied from the redundant operating line rail 41 and the likewise redundant frame terminal 42, the circuit 15 assumes the preferably clocked driving of the switching output stage 14.4 for supplying currents to the lamps 17.4.1 and 17.4.2.

As to the operation of the control units connected to the BUS 39, 40 to influence the light control, a speed and brake-light signal from the ABS control unit 53, can be obtained via the BUS 39, 40, in order to drive the lamps 37.4.1 and 37.4.2 of the brake lights in accordance with the signal and/or to influence, for example, the operating current of the lamps 17.4.1 and 17.4.2 for driving light in dependence on the currently driven speed, so that the on-board system is relieved of unnecessary power consumption. A corresponding signal evaluation can also effect the automatic switching over from the driving light to the parking light, because the wheel speed signals, which can be obtained, for example, from the ABS control unit 52, are constantly available via the BUS. A waiting time can be provided in order to avoid frequent dimming or switching over to parking light in cases of only brief stops.

Furthermore, the processing of the brightness signal of the light sensor 55.1 has the effect that the switching on of the output stage 14.1 for supplying the lamp 17.1 for the interior light is prevented whenever there is a certain minimum brightness outside the vehicle. The same applies correspondingly to the lamp(s) 52.1 of the exit light(s) and/or the lamp 37.8 of the trunk light. With respect to the latter, numeral 48 denotes an alternative driving path, for instance directly from a switching contact, preferably a frame switching contact, which can permit a continuous driving of the lamp 37.8, for example even in cases where the microcomputer 32 has become defective, if an inverting switching output stage 33.8 is used.

For this purpose, by way of example, the central control unit 50, receives the signals of the door contacts for interior light control, i.e. for driving the lamp 17.1 of the interior light, of the indicator switch and of the hazard-warning switch (not shown). The lamps of the direction indicators can be controlled via a monostable timing function, which is reset either via the steering wheel angle or sensing and evaluation of differential wheel speeds. The door control unit 52 communicates with the signals of the outside mirror unit 55. In the event of a rear-end collision, the acceleration signal of the air bag control unit 54 can be used for automatically driving the hazard warning lights for a certain time when the vehicle is stationary.

The output stages 34.1, 34.2 and the electromechanical switching component 35 are assigned interruption functions exclusively, so that they respond only when there is an overload (smart fuse). These parts may either be integrated as component parts of the rear lamp module 31 in the latter or else be configured separately and to this extent connectable to the rear lamp module 31. The integrated solution allows installation of the module 31 even in spaces which are not very accessible. If accessibility is required, the rear lamp module 31 may preferably be installed in the region of the right-hand or left-hand rear lights of the vehicle, since these generally have to be accessible in any case for the purpose of exchanging lamps.

Within the scope of the invention, furthermore, lamp currents can be clock-controlled in a time-shifted and/or phase-shifted mode, so that, for example, switching-on and switching-off current edges do not occur at the same time. This, together with cabling configured for electromagnetic compatibility, minimizes electromagnetic disturbances. Finally, at least one test circuit, implemented in one of the two modules 11 and 31, can be used at the beginning of driving to check the functioning of all the lights.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A light controlling device for a motor vehicle, comprising an operating switch and electronic apparatus assigned to the operating switch for supplying current to a multiplicity of lamps of an operating light system and having for each lamp function at least one controlled switching component for clock-controlled supplying of current to an assigned lamp, wherein the apparatus includes a light switch module and a rear lamp module, clock controlling apparatus being distributed over the rear lamp module, and both modules being connected to each other via a maximum of three line conductors in addition to a frame terminal, the light switch module being arranged in a dashboard region and the rear lamp module being installed in a rear region adjacent the rear lights, and the lamp currents being clock-controlled such that the luminosity of certain lights can be lowered as required and/or the on-board system voltage can be increased temporarily without the luminosity changing significantly as a result.

2. The light controlling device according to claim 1, wherein both modules each comprise a microcomputer.

3. The light controlling device according to claim 2, wherein the light switch module has a redundant frame terminal and a redundant operating voltage terminal for controlling the lamps for the driving light and, furthermore, circuits independent from the microcomputer by way of which the associated lamps can be driven alternatively in the event of failure of the microcomputer in the light switch module.

4. The light controlling device according to claim 2, wherein the clock controlling apparatus comprise electrically driveable switching components, a shunt being provided in at least one lamp circuit, and the voltage dropping in proportion to the current at said shunt being feedable to the corresponding microcomputer and the switching component supplying current to the relevant circuit being driven by a disabling signal when said voltage has exceeded a predetermined limit.

5. The light controlling device according to claim 1, wherein the lamps of the lights for the driving light when stationary, are dimmable with a light power corresponding to a customary parking light.

6. The light controlling device according to claim 5, wherein the device is configured such that dimming occurs automatically at a transition from driving to stationary and is discontinued when driving is resumed.

7. The light controlling device according to claim 1, wherein the device is configured such that, after transition from driving to stationary, the power supply of the lamps of the lights for driving light is automatically cut off and the lamps of the lights for parking light are supplied with current.

8. The light controlling device according to claim 1, wherein, in the event of failure of one of a lamp and a circuit for driving light, the lamp of the corresponding headlamp is configured to be supplied with current clock-controlled for lower light emergency power.

9. The light controlling device according to claim 1, wherein a light sensor emits a brightness signal to effect, according to requirements, an automatic switching on of light circuits.

10. The light controlling device according to claim 1, wherein a light sensor emits a brightness signal to prevent, according to requirements, a switching on of certain light circuits.

11. The light controlling device according to claim 10, wherein the certain light circuits being prevented from being switched on include at least one of the circuits for trunk lighting, interior light and exit lighting, and the device is configured to communicate via a bus line with at least one door control unit.

12. The light controlling device according to claim 9, wherein the light sensor is a component part of an outside mirror unit communicating with a door control unit.

13. The light controlling device according to claim 10, wherein the light sensor is a component part of an outside mirror unit communicating with a door control unit.

14. The light controlling device according to claim 9, wherein the light sensor is arranged at a lower boundary surface of an outside rear-view mirror.

15. The light controlling device according to claim 1, wherein the rear lamp module is configured to be installable in a region of one of right-hand or left-hand rear lights.

16. The light controlling device according to claim 1, wherein a two-wire bus line operatively connects the light switch module and the rear lamp module.

17. The light controlling device according to claim 1, wherein the light switch module comprises a manually actuatable operating switch for light control, via which at least one data word into which the currently desired lighting situation is coded is enterable into the microcomputer of the light switch module.

18. The light controlling device according to claim 1, wherein two of the three connecting conductors constitute a serial bus line, via which the two modules are communicable with each other.

19. The light controlling device according to claim 18, wherein the modules are configured to communicate at least with a central control unit connected to the bus line and with an instrument cluster in the dashboard.

20. The light controlling device according to claim 18, wherein the modules are configured to communicate with an ABS control unit connected to the bus line.

21. The light controlling device according to claim 18, wherein the rear lamp module is arranged to obtain a braking signal from an ABS control unit via the bus line.

22. The light controlling device according to claim 3, wherein the redundant operating voltage terminal is arranged to be supplied from an energy source which is redundant with one of a vehicle battery and an on-board system rail for a passenger restraint system connected to the bus line.

23. The light controlling device according to claim 22, wherein means is provided, according to requirements, for driving all flashing lights in a flashing sequence for a predetermined time period via a signal emitted when the passenger restraint system control unit responds.

24. The light controlling device according to claim 1, wherein the clock control apparatus of the lamp currents is operative to allow one of a phase-shifted and time-shifted clock control of various lamp currents.

* * * * *